Aug. 12, 1941.  A. BIEREND  2,252,488

PRESSURE-SEALING FASTENING FOR VESSEL COVERS

Filed July 24, 1939

WITNESSES:
James F. Mosser
Andrew J. Cook.

INVENTOR
ALFRED BIEREND.
BY
ATTORNEY

Patented Aug. 12, 1941

2,252,488

UNITED STATES PATENT OFFICE 2,252,488

PRESSURE-SEALING FASTENING FOR VESSEL COVERS

Alfred Bierend, Berlin-Charlottenburg, Germany, assignor to Westinghouse Electric & Manufacturing Company, East Pittsburgh, Pa., a corporation of Pennsylvania Application July 24, 1939, Serial No. 286,230
In Germany February 10, 1939

7 Claims. (Cl. 220—55)

My invention relates to a high-pressure vessel including hollow body and head members and it has for an object to provide improved means for exerting pressure on the head member to cause the latter to effect sealing abutment relation with respect to the body member.

Where the hollow body members of high-pressure vessels are provided with removable cover or head members, it is necessary that the latter shall be secured to the body members under such pressure as to seal effectively against the high internal pressure. Head bolts or screws are subject to the limitation that, as the pressure increases, the necessary bolt stresses increase, and, finally, a pressure is reached where the structure does not possess sufficient room for the necessary bolts, or the material stresses of the bolts or screws will be so high as to be dangerous. Therefore, in accordance with the present invention, there is provided a hollow body member having a mouth end portion arranged to receive a head or cover member together with mechanisms reacting against an interior abutment of the mouth end portion and engaging the head member so as to cause the latter to effect the requisite sealing engagement with respect to the body member, the mechanisms being actuated by any suitable means carried by one of the members. Accordingly, a further object of my invention is to provide apparatus of this character for maintaining the sealing relation.

A further object of my invention is to provide a high-pressure vessel including a body member having a mouth end portion formed with interior spaced abutments and a cover member having a peripheral portion engaging one of the abutments to effect the necessary abutment sealing relation together with a circumferential series of toggle mechanisms engageable with the other abutment and with the head peripheral portion to exert sealing pressure on the latter, the toggle mechanism being operated by suitable means carried by one of the members.

Figure 1:
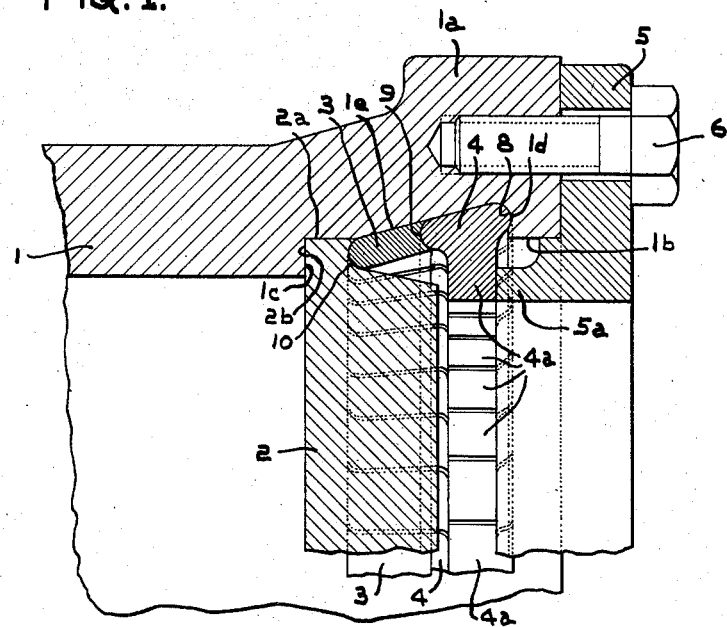
Figure 2:
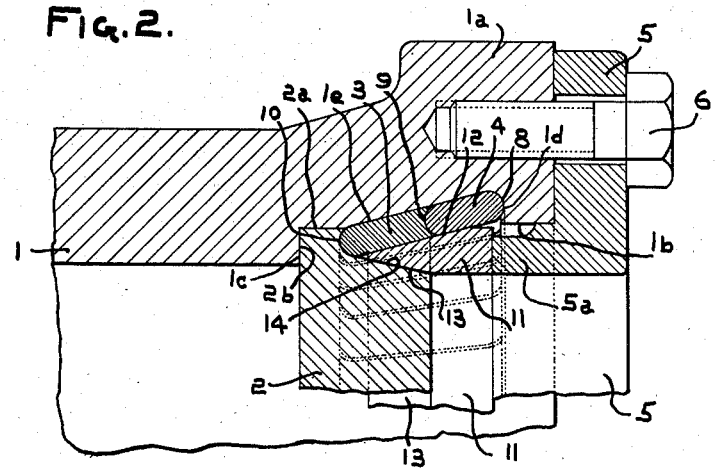

These and other objects are effected by my invention as will be apparent from the following description and claims taken in connection with the accompanying drawing forming a part of this application, in which:

Figure 1 is a detail sectional view of a high-pressure vessel and head and showing the improved means for exerting sealing pressure on the latter; and, Figure 2 is a view similar to Figure 1 but showing a second embodiment.

In the drawing, the high-pressure vessel or container, serving any suitable purpose, is shown as being comprised by a hollow body member 1 and a head member 2 maintained sealed with respect thereto against relatively high internal pressure by the improved means to be described.

The hollow body member 1 is provided with a mouth end portion 1a having mouth opening 1b and inner and outer spaced abutments 1c and 1d, the abutment 1c facing outwardly and the abutment 1d facing inwardly and being disposed outwardly of the first abutment and adjacent to the mouth opening 1b. The mouth end 1a is preferably provided with the convergent or conical seat surface 1e extending inwardly from the abutment 1d and serving the purpose to be described.

The head member 2 has a peripheral or flange portion 2a whose inner face 2b engages the abutment 1c and whose radius is sufficiently less than that of the mouth opening 1b to provide for insertion and removal of the head through the mouth opening.

A circumferential series of mechanisms are arranged between the inwardly-facing outer abutment 1d and the peripheral portion 2a and they are operated by means carried by one of the members of the vessel, for example, the body member 1, to cause the peripheral portion 2a to engage the abutment 1c with the requisite sealing pressure. Mechanisms of the toggle type are shown for this purpose, each mechanism including inner and outer toggle links 3 and 4, the outer links 4, in Fig. 1, having inwardly-extending lever arms 4a engageable by the inwardly-extending flange 5a of the ring 5 attached to the body member by screws 6.

The outer ends of the links 4 have pivotal connections 8 with respect to the outer abutment 1d, the adjacent ends of the links 3 and 4 have knee pivotal connections 9, and the inner ends of the links 3 have pivotal connections 10 with respect to the peripheral portion 2a. The various parts are so dimensioned that, with the head in place, the knee pivotal connections 9 of the adjacent ends of the links 3 and 4 will be disposed inwardly from the conical surface 1e and including an obtuse angle.

The ring 5 is brought into position with the extension 5a engaging the lever arms 4a of the links 4. As the screws 6 are tightened, the ring 5 will be moved inwardly to cause clockwise movement of the links 4, thereby bringing about toggle movement of the links 3 and 4 to cause the face 2b of the peripheral portion 2a to exert the required pressure sealing relation with respect to the abutment *Ic*, the links *3* and *4* preferably engaging the conical surface or seat *Ie* when the head is in sealing relation.

From the structure described, it will be apparent that the sealing load is carried by the toggle mechanisms and that the resulting stress for this purpose is divided, the major portion thereof being carried by the abutment *Id* of the mouth end portion *Ia* and the minor portion being carried by the screws or bolts *6*, the latter being required to exert only such force on the toggle mechanisms as is required to actuate the latter.

In Figure 2, there is shown an arrangement which is similar to Figure 1 except for the means for operating the toggle links *3* and *4*. Instead of having the links *4* provided with crank or lever arms *4a*, for engagement by the sleeve extension *5a*, in this embodiment, the sleeve extension engages a wedge ring *11* whose outer conical surface *12* effects outward movement of the pivotal connections *9* of the links, the ring having an inner conical surface *13* cooperating with the conical surface *14* of the head member *2*. With this arrangement, assuming the head member *2* to be in place and the links to be assembled, then the pivotal connections *9* will be disposed inwardly from the conical surface *Ie* such that the links include an obtuse angle. As the wedge ring *11* is moved inwardly, the pivotal connections *9* are moved outwardly and the toggle effect is secured as already described.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In combination, a hollow body member having a mouth end portion provided with a mouth opening and first and second interior spaced abutments, the first abutment facing outwardly and the second abutment facing inwardly and being disposed adjacent to the mouth opening, a head member having a peripheral portion whose inner face engages said first abutment and whose outer face is disposed in opposed relation with respect to said second abutment, mechanisms each having abutment edges for engagement with the second abutment and the head peripheral portion outer face, each mechanism including means providing for variation in the distance between the edges so that such distance may be increased to cause them to bear against the second abutment and the head peripheral portion outer face to hold the peripheral portion of the head under pressure against said first abutment, and means carried by one of said members to actuate said mechanisms to increase the distance between the abutment edges thereof in order to exert pressure on the peripheral portion of the head to seal the latter against said first abutment.

2. In a pressure vessel, a hollow body member having an inner outwardly-facing shoulder; a head member provided with a peripheral portion having sealing relation with respect to said shoulder; a circumferential series of toggle mechanisms; each mechanism including inner and outer links having their adjacent ends in pivotal relation, having the outer end of the outer link in pivotal relation with respect to the vessel, and having the inner end of the inner link in pivotal relation with respect to the peripheral portion of the head; and means carried by one of the members and cooperating with the adjacent link end pivotal connections to cause the latter to move outwardly to exert sealing pressure on the head.

3. In a pressure vessel, a hollow body member having an inner outwardly-facing shoulder; a head member provided with a peripheral portion having sealing relation with respect to said shoulder; a circumferential series of toggle mechanisms; each mechanism including inner and outer links having their adjacent ends in pivotal relation, having the outer end of the outer link in pivotal relation with respect to the vessel, and having the inner end of the inner link in pivotal relation with respect to the peripheral portion of the head; inwardly-extending lever arms carried by the outer links; a ring engageable with the lever arms; and screw means carried by one of the members and cooperating with the ring to cause the latter to move inwardly to actuate the toggle mechanisms.

4. In a pressure vessel, a hollow body member having an inner outwardly-facing shoulder; a head member provided with a peripheral portion having sealing relation with respect to said shoulder; a circumferential series of toggle mechanisms; each mechanism including inner and outer links having their adjacent ends in pivotal relation, having the outer end of the outer link in pivotal relation with respect to the body member and having the inner end of the inner link in pivotal relation with respect to the peripheral portion of the head; means movable to cause the adjacent link end pivotal connections to move outwardly; a ring engageable with the last-named means; and screw means carried by one of the members for causing the ring to move inwardly to effect movement of said means in order to bring about outward movement of the adjacent link end pivotal connections to exert sealing pressure on the head member.

5. In a pressure vessel, a hollow body member having a mouth end provided with a mouth opening and first and second interior spaced abutments; the first abutment facing outwardly and the second abutment facing inwardly and being disposed adjacent to the mouth opening; a head member having a peripheral portion whose inner face engages said first abutment and whose outer face is disposed in opposed relation to said second abutment; said mouth opening having a radius which is sufficiently larger than that of the head member peripheral portion to provide for insertion and removal of the head member through the mouth opening; pairs of inner and outer links; the inner links having pivotal relation with respect to the head peripheral portion, the outer links having pivotal relation with respect to said second abutment, and each pair of links having their adjacent ends arranged in pivotal relation; means movable to cause the link adjacent end pivotal connections to move outwardly to exert sealing pressure on the head; and means carried by one of said members to actuate the last-named means.

6. In a pressure vessel, a hollow body member having a mouth end portion provided with a mouth opening and first and second interior spaced abutments; the first abutment facing outwardly and the second abutment facing inwardly and being disposed adjacent to the mouth opening; a head member having a peripheral portion whose inner face engages said first abutment and whose outer face is disposed in opposed relation with respect to said second abutment; the radius of the mouth opening being sufficiently larger than that of the head member peripheral portion to provide for insertion and removal of the head member through the mouth opening; said second abutment having a larger radius than the first abutment and said mouth end portion having an interior conical surface extending inwardly from the second abutment toward the first abutment; pairs of inner and outer links; the inner links having their inner ends in pivotal relation with respect to the head member peripheral portion, the outer links having their ends in pivotal relation with respect to said second abutment, and each pair of links having their adjacent ends arranged in pivotal relation and said links being arranged substantially to engage said conical seating surface when the head member is in sealing relation with respect to said first abutment; and means carried by one of the members for causing the adjacent link end pivotal connections to move outwardly.

7. In a pressure vessel, a hollow body member having a mouth end portion provided with a mouth opening and first and second interior spaced abutments; the first abutment facing outwardly and the second abutment facing inwardly and being disposed adjacent to the mouth opening; a head member having a peripheral portion whose inner face engages said first abutment and whose outer face is disposed in opposed relation with respect to said second abutment; the radius of the mouth opening being sufficiently larger than that of the head member peripheral portion to provide for insertion and removal of the head member through the mouth opening; said second abutment having a larger radius than the first abutment and said mouth end portion having an interior conical surface extending inwardly from the second abutment toward the first abutment; pairs of inner and outer links; the inner links having their inner ends in pivotal relation with respect to the head peripheral portion, the outer links having their ends in pivotal relation with respect to said second abutment, and each pair of links having their adjacent ends arranged in pivotal relation and said links being arranged substantially to engage said conical surface when the head member is in sealing relation with respect to said first abutment; inwardly-extending lever arms carried by the outer links; a ring engageable with said lever arms; and screw means connected to one of the members and operative to move the ring inwardly to bring about angular movement of the outer links and consequent outward movement of the adjacent link and pivotal connections.

ALFRED BIEREND.